Patented Nov. 25, 1930

1,782,648

UNITED STATES PATENT OFFICE

HARRY C. FISHER, OF CINCINNATI, OHIO, ASSIGNOR, BY MESNE ASSIGNMENTS, TO THE PHILIP CAREY MANUFACTURING COMPANY, A CORPORATION OF OHIO

PROCESS OF COLORING SLATE GRANULES

No Drawing.   Application filed April 29, 1925.   Serial No. 26,828.

My process relates to the fixing into and upon granulated slate particles of desired pigmenting materials, in order to provide a colored surfacing material.

It is my object to provide a coloring for slate which will result in a surface embedding of mineral pigments. It is further my object to provide a material which can be imposed upon slate granules when in solution or suspension, and which when the coated slate is heated will pass through one or more colloidal stages, such as an hydroxide stage, and then into an oxide. It is of the essence of my process first to color mineral material by a surface embedding facilitated by the penetrative condition of the pigments used, which I achieve in the stages of my process; and second where desired, to secure shades of color only produced by the colloidal fineness of subdivision of the pigmenting materials.

My object in the use of pigmenting agents of this character is to produce an embedding action, and thus a very permanent bond. Another object is to provide various grades of browns and yellows through a particular reaction with particular materials which pass through the stages noted. Another object in this last connection is to provide varying types of browns, varying to yellows or to red, dependent upon the oxidizing or non-oxidizing action in the roasting devices or kilns.

So far as advised, I believe that the result of forming hydroxides in jelly-like form, and then heating them on a body of the nature of granulated slate, results in an intermediate penetrative stage between hydroxide and oxide which increases the depth of the penetration of the resulting oxides greatly, and of a great many processes of coloring granulated slates, we find that the hydroxide to oxide method, gives the deepest penetration.

I find it most convenient, primarily, to employ several salts of metals in solution, rather than to attempt to obtain a direct hydroxide treatment of the granules, and I prefer to produce the hydroxides on the slate itself, and then, as stated, produce the oxides from the hydroxides, with the resulting color and penetration, which control of proportions of the pigmenting agents used, control of the temperature of roasting and control of roasting atmosphere, will give.

Referring first to the production of a seal brown color, I proceed to make up a water solution of sodium dichromate and iron sulphate into which granulated slate is mixed so as to coat the particles. The slate is then passed through a roaster where it is agitated, and raised to a glowing heat.

Referring to chemical proportions, the formula for the reaction taking place in the solution in which the slate is mixed, is as follows—$3Na_2Cr_2O_7(2H_2O)$ plus $18FeSO_4(7H_2O)$ plus $21H_2O = 3Na_2SO_4$ plus $5Fe_2(SO_4)_3$ plus $6Cr(OH)_3$ plus $8Fe(OH)_3$.

It makes no essential difference in result whether the atmosphere be oxidizing or non-oxidizing, where the proportions of the chromium and iron salts are as their correct combining value in the above reaction formula.

The result of application of heat is to form the hydroxides of iron and chromium, which are a jelly, being colloidal. The continued heat action appears to cause the jelly to pass through a highly penetrative stage, during which the penetration into the slate of the original wet solution, is increased, and finally the hydroxides are dehydrated leaving the oxides of the two metals. The resulting color of the granulated slate is a seal brown, which is the combined color result of the two metallic oxides in intimate mixture, one at least of which is in a state of colloidal subdivision.

I believe from my experiments that the securing of metallic pigmenting compounds in a state of subdivision comparable to the colloidal, in at least one stage of the process, is a matter of fundamental importance. Not only does the great penetration of the brown color described above, which penetration can be measured by the microscope, appear to result from a colloidal condition of at least one of the pigments in some stage of the process, but the resultant color appears to be due in part to a condition of division of at least the iron oxide, which fineness is comparable to a colloidal division.

The conditions tending to promote the formation of such finely divided oxides are complex. In certain instances I found that the condition of the atmosphere in the kiln or roasting device will determine whether or not an oxide will be formed in a state of colloidal subdivision; in other instances, notably the instance of the brown described above, where a reaction takes place with the combining metallic compounds present in the exact chemical proportions for combining, the condition of atmosphere appears to have no effect and the resulting colloidal condition of at least one of the metallic oxides appears to be brought about by the presence in the mixture of a substance or substances which act as peptizing agents. In the present instance it is possible that the chromium compounds present act as such a peptizing agent upon the iron.

The brown color is deeply penetrant of the slate granules and very permanent, showing no tendency to solubility, or to color change under conditions of ordinary attrition.

If the combining proportions are not substantially followed, the resulting colors will vary both in accordance with the natural color of the oxide that predominates, and in accordance with whether the atmosphere of the roaster be oxidizing or non-oxidizing.

Thus where more iron sulphate is introduced than the equivalent formula calls for, and oxidizing atmospheres are maintained in the roaster, the final color will tend toward redder browns.

If, however, the atmosphere is kept non-oxidizing, as by introduction of steam, or the presence of gases such as sulphur dioxide or trioxide from the decomposition of a sulphate, the resulting color will be yellowish brown tending toward straw color.

Where more of the dichromate is used the resulting color is toward greenish brown in oxidizing atmosphere, and in non-oxidizing atmosphere the yellowish tinge is developed but is less prominent.

Thus in the process using the iron and chromium salts in which portions of the materials will pass through hydroxide stages during heating, a great degree of penetration is obtained, and the final color may be varied by using enough additional of either of the elements to result in oxides which do not pass through hydroxide stages, and controlling the oxidizing nature of the atmosphere in the roaster to impart the yellowish or reddish tinges to the resulting color. It will be noted from the reaction using equivalent proportions of ferrous sulphate and sodium dichromate that not all of the ferrous sulphate changes into ferric hydroxide, some becoming ferric sulphate which on roasting also changes to ferric oxide, but may not be so finely divided.

I do not wish to limit myself to cases in which all of the oxide of any metal in the pigment is in a state of colloidal subdivision, or to cases in which a portion of the oxides of all metals present are of colloidal fineness, or to cases in which only oxides, whether of colloidal fineness or not, compose the pigmenting material. I feel that my process comprises a penetration of mineral pigments under the influence of heat brought about by the use of a jell containing materials in a state of colloidal fineness, and the production of pigment-colors by depositing metallic compounds on and within the surface of slate in a state of colloidal fineness.

I am aware that it has been suggested to impart colors to marble and other stones by forming the hydroxide of a metal within their pores and then dehydrating, but I do not know of any one using a combination of metallic hydroxides. Nor am I aware of any instance in which two different metallic salts are formed into hydroxides in a process similar to mine. Nor do I believe that any one has previously controlled the resulting color from iron pigmentation in which the red to yellow color change has been controlled by roaster atmospheres, or by the addition of a substance capable of acting as a peptizing agent. I believe that no one has employed a hydroxide of a metal in pigmenting minerals where the hydroxide has been caused to pass through a highly penetrating stage, as the temperature increases, so that at high temperatures a metallic oxide in a state of extreme fineness is formed within the pores and interstices of the granular material. Nor do I believe that any one has hitherto controlled the color of the mineral pigments formed by using any means to bring about or prevent a condition of colloidal subdivision in them.

I do not wish to be bound by my theories of the several changes and reactions noted, as the statements made in the above specification are based on present day chemical theory judging from observation of the materials during the stages of the processes described, and from observation of the resultant products.

Having thus described my invention, what I claim as new and desire to secure by Letters Patent, is:—

1. A process of coloring granulated permeable mineral matter which will withstand a roasting treatment, which consists in forming a granular mineral matter which is coated with a jelly-like substance containing hydroxide of iron together with other metallic hydroxides and heating the mineral so coated with control of oxygen content of the atmosphere of heating to produce a tightly adherent and penetrative color coating of graded shades from yellow to dark brown.

2. A process for forming a brown color on granulated slate which consists in treating the slate with iron and chromium salts in proper combining proportions to form hydroxides of the iron and chromium upon heating, and applying heat to the treated product to form said hydroxides and continuing the heat to convert the hydroxides to oxides.

3. A process for forming colors on granulated slate which consists in mixing the slate with a solution of salts of two or more metals, said salts being of a character which will by reaction upon application of heat form the hydroxides of said metals, and then treating the product with heat sufficient to cause said hydroxides to be formed and with further heat to convert the hydroxides to their oxides.

4. A process for coloring granular slate brown which consists in forming on the granules a coating of iron and chromium hydroxides in jelly form and heating the product so formed sufficiently to dehydrate it and form oxides, at least in part, from said hydroxides.

5. A process for forming colors on granulated slate which consists in mixing the slate with a solution of compounds of two or more metals, said compounds being of a character which will by reaction upon application of heat form the hydroxides of said metals, and then treating the product with heat sufficient to cause said hydroxides to be formed and with further heat to convert the hydroxides to their oxides, one of said metal salts at least, being in excess of proper combining proportions.

6. A process for forming colors on granulated slate which consists in mixing the slate with a solution of salts of two or more metals, said salts being of a character to react to form hydroxides of the metals, in the form of a jell, heating the granules to cause the hydroxide jell to be formed, and further heating the materials to convert the hydroxides to their oxides, one of said metal salts at least being in excess of proper combining proportions, and the atmosphere of the heat treatment being controlled to effect the nature of the color produced.

7. A process for coloring granulated slate which consists in coating slate granules with penetrative colloidal metallic compounds and then dehydrating the colloid to an oxide form at least in part.

8. A process for coloring granulated permeable mineral matter which will withstand a roasting treatment which consists in treating the mineral matter with penetrative colloidal metallic compounds, and dehydrating the colloid in the presence of a peptizing agent.

9. In a process of coloring permeable mineral matter which will withstand a roasting treatment, a method of producing pigment colors which are due to the fineness of subdivision of the pigmenting substance, comprising treating said mineral matter with a penetrative metallic hydroxide in colloidal form and treating said colloidal compound with heat in the presence of an atmosphere of reduced oxygen content to produce a pigment in a state of subdivision of colloidal fineness.

10. A process of coloring granulated permeable mineral matter which will withstand a roasting treatment which consists in forming a solution of an iron salt and other salts which when heated will result in the forming of iron hydroxide among other things, wetting the granulated matter with the solution, and applying heat to the wetted particles, first to form the said hydroxide, and then to convert it to a yellowish highly penetrant and permanent pigmenting body, said heat, in the second stage at least, being applied under non-oxidizing conditions.

11. A process for coloring granulated slate which consists in wetting the slate with a solution of an alkaline di-chromate in the presence of a metallic salt which will react with the dichromate to form a jell and then heating the materials to dehydrate the jell, forming oxides thereof at least in part.

HARRY C. FISHER.